(12) United States Patent
Kim et al.

(10) Patent No.: US 9,669,728 B2
(45) Date of Patent: Jun. 6, 2017

(54) SYSTEM AND METHOD FOR CONTROLLING LDC OF HYBRID VEHICLE

(71) Applicant: Hyundai Motor Company, Seoul (KR)

(72) Inventors: Jee Heon Kim, Gyeonggi-do (KR);
Hyun Wook Seong, Gyeonggi-do (KR);
Won Kyoung Choi, Gyeonggi-do (KR);
Dong Jun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/929,457

(22) Filed: Nov. 2, 2015

(65) Prior Publication Data
US 2016/0303993 A1    Oct. 20, 2016

(30) Foreign Application Priority Data
Apr. 14, 2015    (KR) .................. 10-2015-0052581

(51) Int. Cl.
*B60W 20/00*    (2016.01)
*B60W 10/00*    (2006.01)
*B60L 11/00*    (2006.01)
*H02M 3/00*    (2006.01)
*B60L 11/18*    (2006.01)
(Continued)

(52) U.S. Cl.
CPC ....... *B60L 11/1868* (2013.01); *B60L 11/1861* (2013.01); *B60W 10/26* (2013.01); *B60W 20/13* (2016.01)

(58) Field of Classification Search
CPC combination set(s) only.
See application file for complete search history.

(56) References Cited

U.S. PATENT DOCUMENTS

2008/0242463 A1*  10/2008  Yamada ............. B60K 6/365
                                                   475/5
2010/0270955 A1*  10/2010  Yamakawa ........ H02P 23/0004
                                                   318/139
(Continued)

FOREIGN PATENT DOCUMENTS

JP      H0799706 A     4/1995
JP      4196245 B2    12/2008
(Continued)

*Primary Examiner* — Yonel Beaulieu
(74) *Attorney, Agent, or Firm* — Mintz Levin Cohn Ferris Glovsky and Popeo, P.C.; Peter F. Corless

(57) ABSTRACT

A system and a method for controlling a low voltage DC/DC converter (LDC) of a hybrid vehicle is provided in which a fuel efficiency mode for artificially turning off pulse width modulation (PWM) control of the LDC is added, thereby improving fuel efficiency. Accordingly, the fuel efficiency mode for artificially turning off the PWM control of the LDC is added, so that when the fuel efficiency mode is performed, power of an auxiliary battery is temporarily supplied to an electric field load, thereby reducing power consumption of a main battery and improving fuel efficiency. Further, when the auxiliary battery is separated, power of the main battery is temporarily supplied to the electric field load by performing the PWM control of the LDC, to prevent a phenomenon that power is not supplied to the electric field load when the auxiliary battery is separated.

6 Claims, 5 Drawing Sheets

(51) Int. Cl.
*B60W 20/13* (2016.01)
*B60W 10/26* (2006.01)

(56) References Cited

U.S. PATENT DOCUMENTS

| | | | | |
|---|---|---|---|---|
| 2011/0006598 A1* | 1/2011 | Yamakawa | ............... | B60L 9/18 307/9.1 |
| 2011/0025126 A1* | 2/2011 | Brabec | ................ | B60L 11/1861 307/9.1 |
| 2011/0093151 A1* | 4/2011 | Kojima | ............... | B60W 30/182 701/22 |
| 2011/0241599 A1* | 10/2011 | Nashiki | ................... | B60L 3/003 318/724 |
| 2012/0116626 A1* | 5/2012 | Perkins | ................ | B60W 10/06 701/22 |
| 2012/0173066 A1* | 7/2012 | Yamada | ............. | B60L 11/1803 701/22 |
| 2013/0166126 A1* | 6/2013 | Miyamoto | ............... | F16H 61/30 701/22 |
| 2015/0084410 A1* | 3/2015 | Park | ........................ | B60L 1/00 307/10.1 |

FOREIGN PATENT DOCUMENTS

| | | |
|---|---|---|
| KR | 10-2004-0001975 A | 1/2004 |
| KR | 10-2009-0059175 A | 6/2009 |
| KR | 10-2012-0012522 A | 2/2012 |
| KR | 10-2012-0012661 | 2/2012 |
| KR | 10-1459489 B1 | 11/2014 |
| WO | 2011/050214 | 4/2011 |

* cited by examiner

SYSTEM AND METHOD FOR CONTROLLING LDC OF HYBRID VEHICLE

CROSS-REFERENCE TO RELATED APPLICATION

This application claims under 35 U.S.C. §119(a) the benefit of Korean Patent Application No. 10-2015-0052581 filed on Apr. 14, 2015, the entire contents of which are incorporated herein by reference.

BACKGROUND (a) Technical Field

The present invention relates to a system and a method for controlling a low voltage DC/DC converter (LDC) of a hybrid vehicle. More particularly, the present invention relates to a system and a method for controlling an LDC of a hybrid vehicle, in which a fuel efficiency mode for artificially turning off pulse width modulation (PWM) control of the LDC is added, thereby improving fuel efficiency.

(b) Background Art

A low voltage direct current/direct current (DC/DC) converter (LDC) of a hybrid vehicle mounted within a hybrid vehicle functions to charge an auxiliary battery by converting high-voltage DC voltage output from a high-voltage battery into a low-voltage DC voltage and to supply electricity suitable for a voltage used in each electric field load by monitoring the amount of voltage used in electric field loads of the vehicle. For reference, the LDC refers to a device configured to switch a DC voltage to an alternating current (AC) voltage, increase or decrease the AC voltage using a coil, a transformer, a capacitor, or the like, and rectify the AC voltage into a DC voltage.

A method for controlling the output voltage of a conventional LDC will be described in regards to FIG. 1 which illustrates a power supply flow of a conventional LDC according to the related art. The voltage control of the LDC 20 is performed in a form in which an LDC controller outputs a voltage instruction.

First, the LDC controller determines a control priority order obtained based on a state of charge (SOC) of an auxiliary battery 30, a use of an electric field load 40, a current driving mode, etc. Then, when the voltage control of the LDC 20 is possible, the LDC controller outputs an output voltage instruction to the LDC 20. Accordingly, the auxiliary battery 30 is charged by an output voltage of the LDC 20, or power is supplied to the electric field load 40 by the output voltage of the LDC 20 (see power supply indicated by arrows of FIG. 1).

In particular, the LDC controller compares an auxiliary battery voltage Vbatt with an output voltage instruction Vref. When the output voltage instruction Vref is greater than the auxiliary battery voltage Vbatt, the LDC controller turns on switching control of a switching element (transistor), i.e., pulse width modulation (PWM) control. Further, when the output voltage instruction Vref is less than the auxiliary battery voltage Vbatt, the LDC controller turns off the PWM control.

In other words, as shown in FIG. 2 of the related art, the conventional LDC 20 performs the PWM control when the output voltage instruction Vref is greater than the auxiliary battery voltage Vbatt, and thus, power of a main battery (high-voltage battery) 10 is supplied to the auxiliary battery 30 and/or the electric field load 40. Accordingly, the LDC is mounted within an eco-friendly vehicle such as an electric vehicle, a hybrid vehicle, or a fuel cell vehicle, to supply power to the electric field load to protect discharge of the auxiliary battery through PWM on control and also to charge the auxiliary battery when the voltage of the auxiliary battery is decreased to a predetermined level or less.

However, in the conventional LDC, the time required to turn on PWM control is substantial to thus supply power to the electric field load and/or the auxiliary battery. Therefore, the consumption of power of the high-voltage battery, supplied to the electric field load and/or the auxiliary battery increases, which results in deterioration of fuel efficiency. When the auxiliary battery is separated to be replaced when the PWM control is turned off or when the auxiliary battery is separated due to external impact or the like, power is not supplied to the electric field load, and therefore, the driving of the vehicle is impossible.

SUMMARY

The present invention provides a system and a method for controlling a low voltage DC/DC converter (LDC) of a hybrid vehicle, in which a fuel efficiency mode for artificially turning off pulse width modulation (PWM) control of the LDC may be added, and thus when the fuel efficiency mode is performed, power of an auxiliary battery may be temporarily supplied to an electric field load, thereby reducing the power consumption of a main battery and improving fuel efficiency.

The present invention also provides a system and a method for controlling an LDC of a hybrid vehicle, in which when an auxiliary battery may be separated, power of a main battery may be temporarily supplied to an electric field load by performing PWM control of the LDC, so that it may be possible to prevent a phenomenon that power is not supplied to the electric field load when the auxiliary battery is separated.

In one aspect, the present invention provides a system for controlling an LDC of a hybrid vehicle that may include: a fuel efficiency mode selection unit configured to artificially turn off PWM control of the LDC; an auxiliary battery separation sensing unit configured to sense whether an auxiliary battery is separated; and an LDC controller configured to turn off the PWM control of the LDC in a manipulation of the fuel efficiency mode selection unit, and turn on the PWM control of the LDC when the auxiliary battery separation sensing unit senses separation of the auxiliary battery.

In an exemplary embodiment, when the PWM control of the LDC is turned off in the manipulation of the fuel efficiency mode selection unit, power of the auxiliary battery may be supplied to an electric field load. In addition, when the PWM control of the LDC is turned on when the auxiliary battery separation sensing unit senses the separation of the auxiliary battery, power of a main battery may be supplied to the electric field load.

In another aspect, the present invention provides a method for controlling an LDC of a hybrid vehicle that may include: selecting a fuel efficiency mode for artificially turning off PWM control of the LDC; and turning off the PWM control of the LDC and simultaneously supplying power of an auxiliary battery to an electric field load in the selection of the fuel efficiency mode.

In an exemplary embodiment, in the selection of the fuel efficiency mode, an output voltage instruction Vref of an LDC controller may be input as a value less than that of an auxiliary battery voltage Vbatt. In addition, the method may further include, when the voltage of the auxiliary battery is decreased to a predetermined level or less, supplying power of a main battery to the auxiliary battery and the electric field load by turning on the PWM control again. Further, the method may include sensing whether the auxiliary battery is separated; and inputting an output voltage instruction Vref of the LDC controller as a voltage greater than that of an auxiliary battery voltage Vbatt when separation of the auxiliary battery is sensed, to turn on the PWM control of the LDC and simultaneously supply the power of the main battery to the electric field load.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
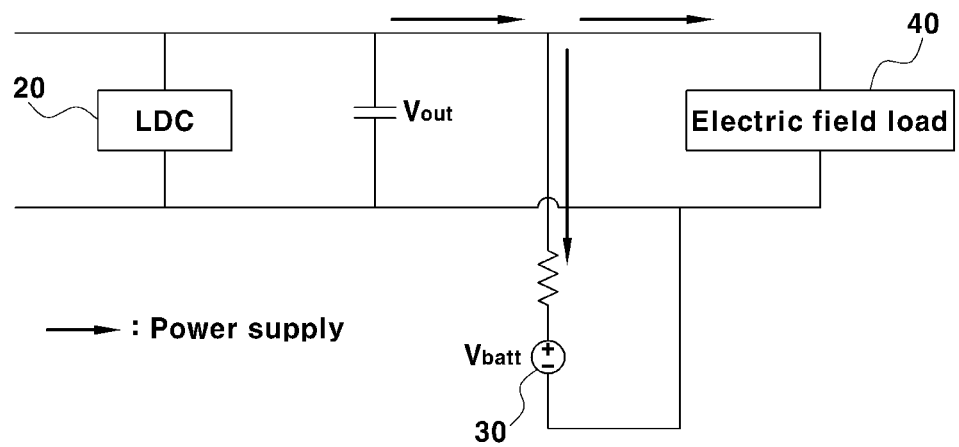
FIGS. 1 and 2 are diagrams illustrating a power supply flow of a conventional low voltage DC/DC converter (LDC) according to the related art.
Figure 2:
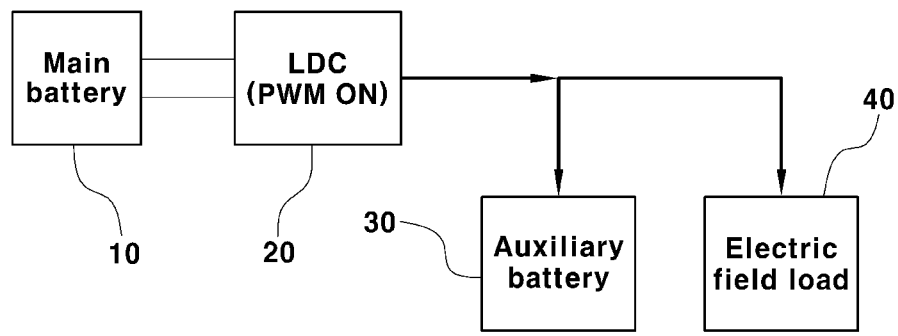

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 4:
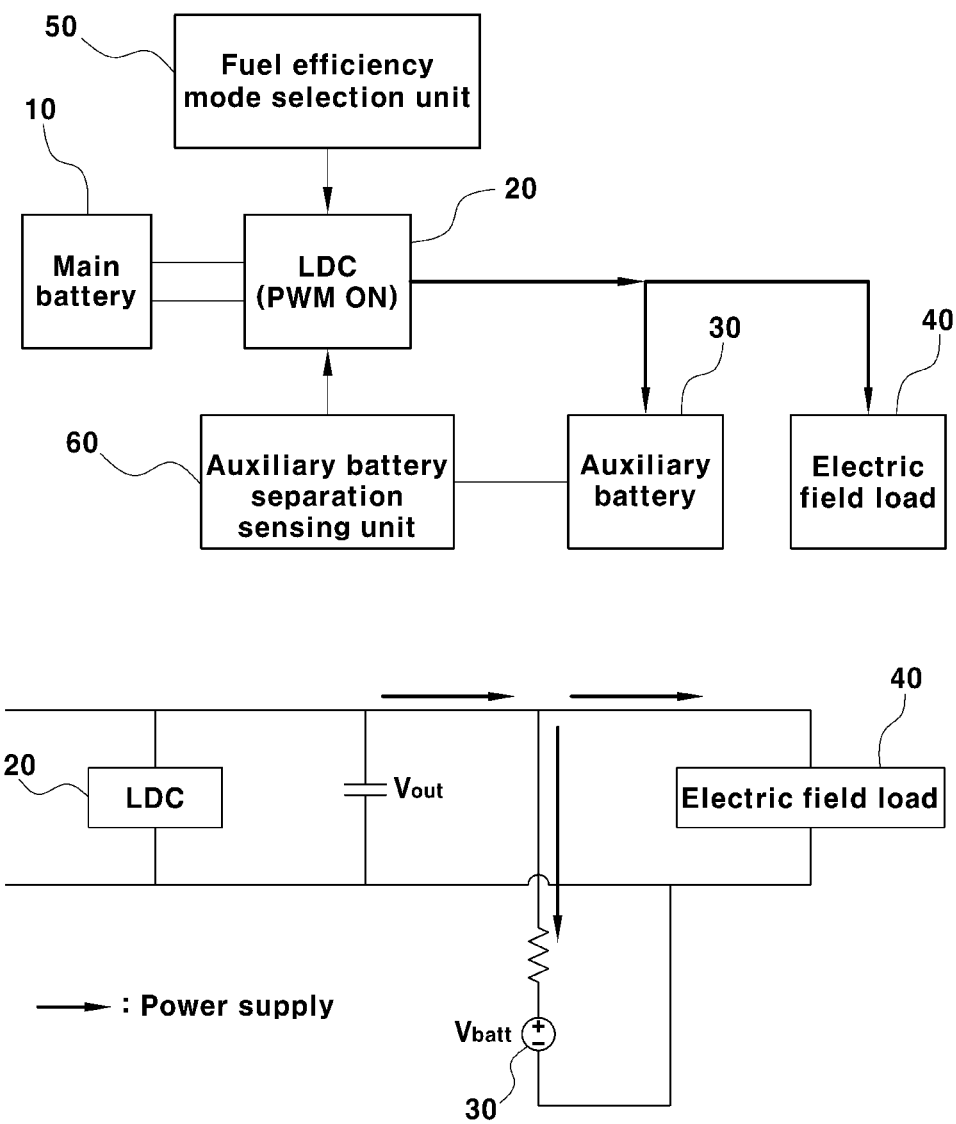
FIGS. 4 to 6 are diagrams illustrating a system for controlling an LDC of a hybrid vehicle according to an exemplary embodiment of the present invention.
Figure 5:
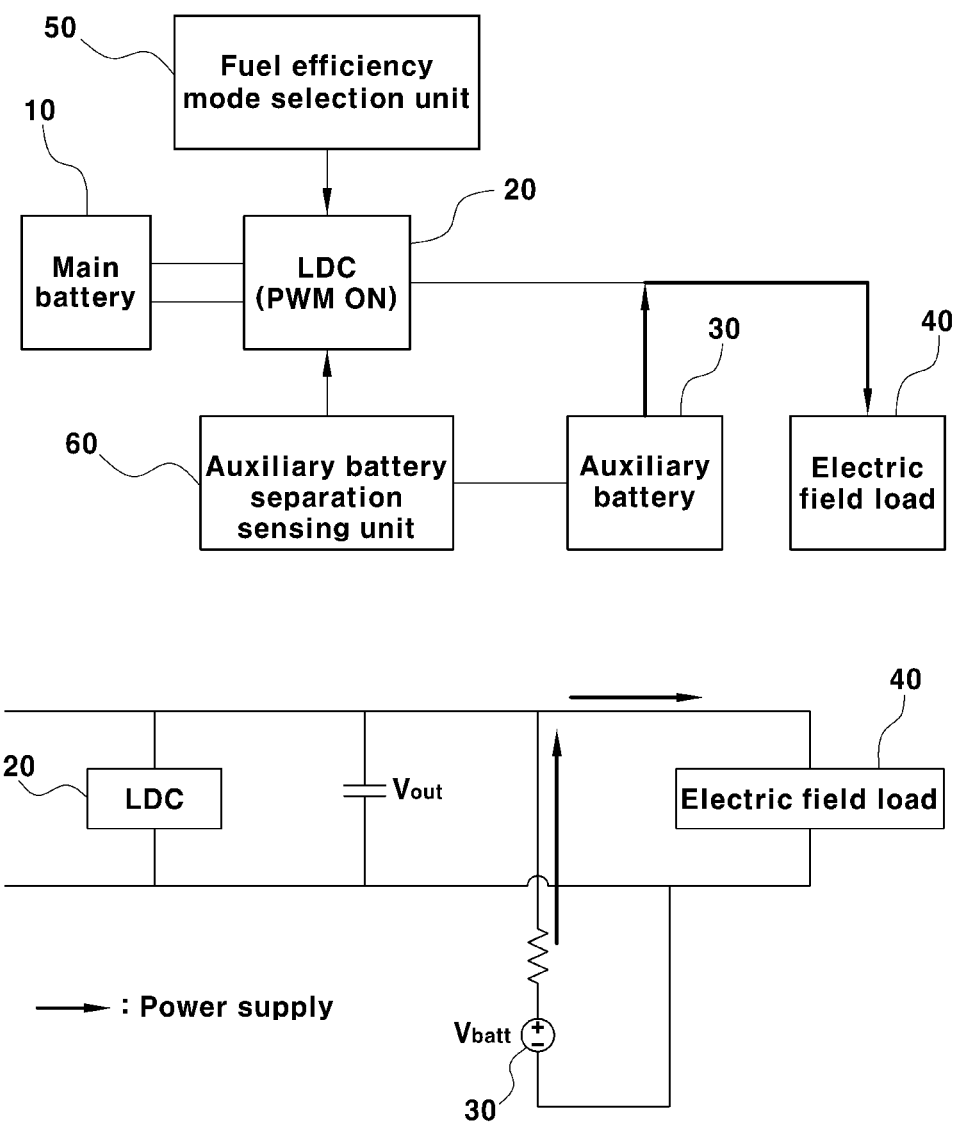
Figure 6:
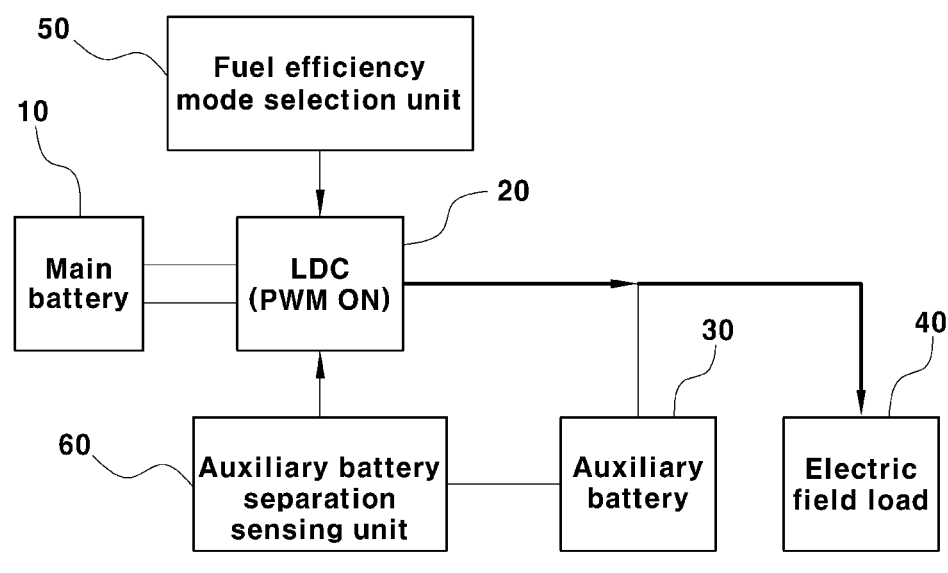
Figure 6:
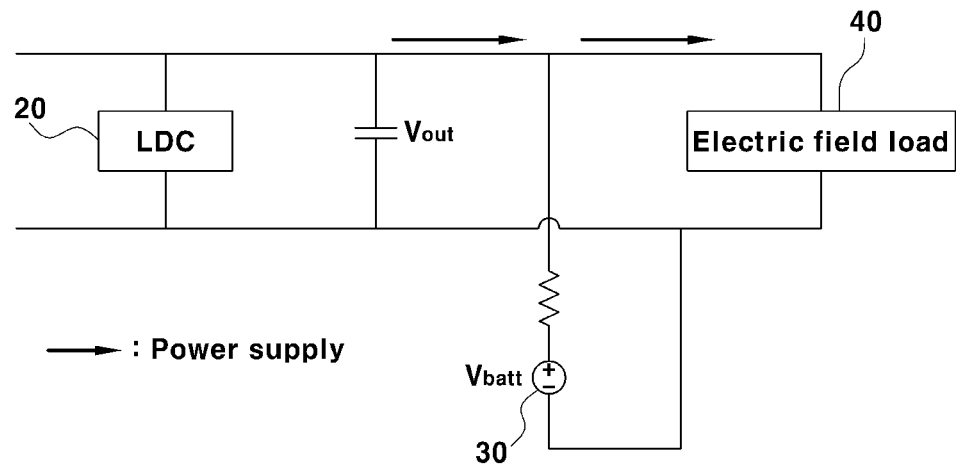

FIGS. 4 to 6 illustrate a system for controlling a low voltage DC/DC converter (LDC) of a hybrid vehicle according to an exemplary embodiment of the present invention. Referring to FIG. 4 which illustrates a pulse width modulation (PWM) on mode for performing PWM control of the LDC, power of a main battery 10 may be supplied to an auxiliary battery 30 to be charged by switching control of a switching element (e.g., transistor) in the LDC 20, i.e., PWM control. Additionally, the power of the main battery 10 may be supplied to an electric field load 40 to be driven.

According to the exemplary embodiment of the present invention, a fuel efficiency mode selection unit (e.g., a input interface or input device) 50 for artificially turning off the PWM control of the LDC 20 may be connected to the LDC 20 to transmit an electrical signal to the LDC 20 via an LDC controller. Further, an auxiliary battery separation sensing unit (e.g., a sensor) 60 configured to sense whether the auxiliary battery 30 is separated may be connected to the LDC 20 to transmit an electrical signal to the LDC 20 via the LDC controller. In other words, the LDC controller may be configured to operate the units of the system.

Referring to FIG. 5 which illustrates a PWM off mode for not performing in the PWM control of the LDC, the LDC controller may be configured to execute the PWM off mode to forcibly turn off the PWM control of the LDC 20 in a manipulation of the fuel efficiency mode selection unit 50. More specifically, when a driver manipulates the fuel efficiency mode selection unit (e.g., an input interface) 50, the LDC controller may be configured to adjust an output voltage instruction Vref for the LDC 20 to be input as a value less than that of an auxiliary battery voltage Vbatt. Since the output voltage instruction Vref is less than the auxiliary battery voltage Vbatt, the PWM off state may be executed.

Thus, when the PWM control is turned off in the manipulation of the fuel efficiency mode selection unit 50, power of the auxiliary battery 30 may be supplied to the electric field load 40, and the driving of the electric field load 40 may be performed more smoothly thus allowing the driving of the vehicle to be performed more smoothly. Accordingly, PWM switching control of the LDC 20 may be prevented from being performed through a fuel efficiency mode for artificially turning off the PWM control of the LDC 20, to reduce the power consumption of the main battery 10, thereby improving fuel efficiency.

Meanwhile, referring to FIG. 6 which illustrates that the PWM control of the LDC is performed in the separation of the auxiliary battery, the LDC controller may be configured to turn on the PWM control of the LDC 20 when the auxiliary battery separation sensing unit 60 receives an auxiliary battery separation sensing signal. More specifically, when the auxiliary battery separation sensing unit 60 receives an auxiliary battery separation sensing signal, the LDC controller may be configured to adjust the output voltage instruction Vref for the LDC 20 to be input as a value greater than that of the auxiliary battery voltage Vbatt, and thus a PWM on state in which the PWM control of the LDC 20 is performed may be executed.

Accordingly, the PWM control of the LDC 20 may be in an on state even though the auxiliary battery is separated, and thus the power of the main battery 10 may be supplied to the electric field load 40. Additionally, the driving of the electric field load 40 may be performed more smoothly, thus allows the driving of the vehicle to be performed more smoothly.

Figure 3:
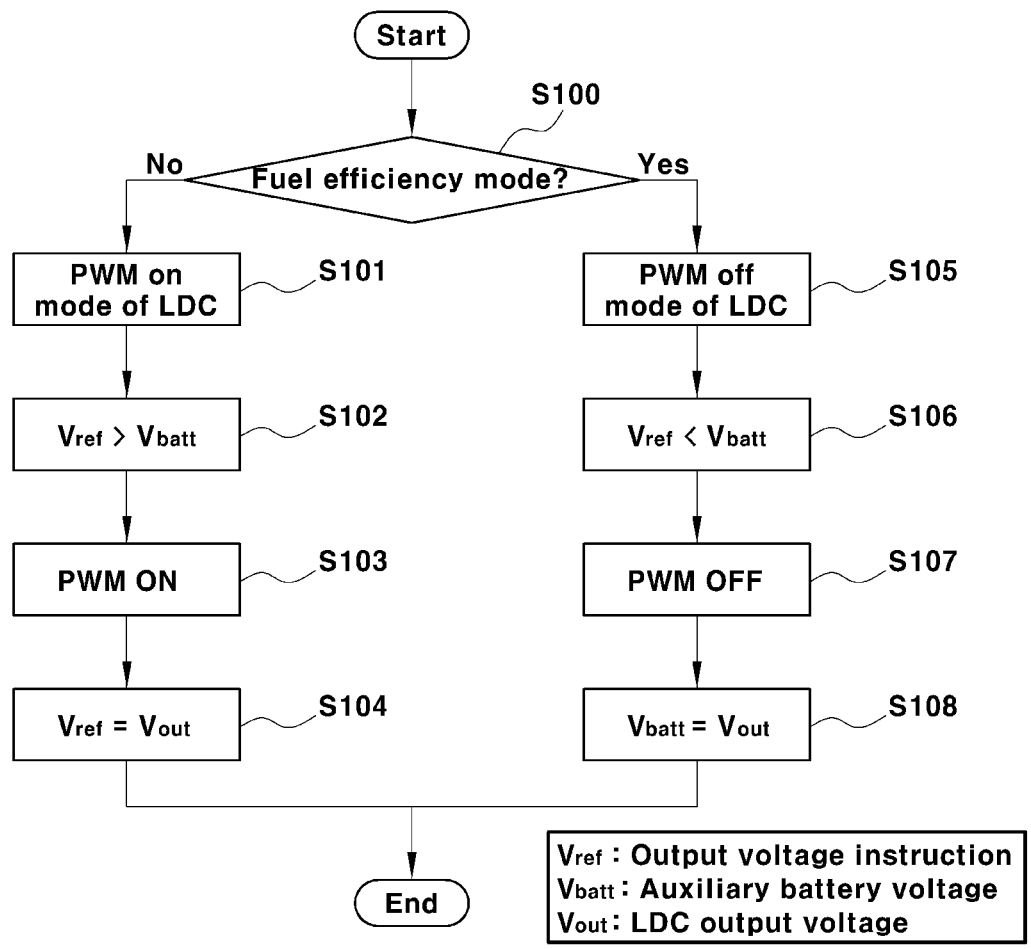
FIG. 3 is a flowchart illustrating a method for controlling an LDC of a hybrid vehicle according to an exemplary embodiment of the present invention.

Moreover, a method for controlling the LDC of a hybrid vehicle based on a configuration of the system will be described for each control mode with reference to FIG. 3.

PWM On Mode

First, the LDC controller may be configured to determine whether the fuel efficiency mode selection unit 50 is manipulated (S100). When the fuel efficiency mode selection unit 50 is not manipulated, the system may enter into the PWM on mode, or the PWM on mode may be maintained (S101). Accordingly, the LDC controller may be configured to execute the output voltage instruction Vref for the LDC 20 to be input as a value greater than that of the auxiliary battery voltage Vbatt (S102).

When the output voltage instruction Vref for the LDC 20 is greater than the auxiliary battery voltage Vbatt, the PWM on mode for performing the switching control of the switching element (transistor) in the LDC 20, i.e., the PWM control may be executed (S103). Thus, a real output voltage Vout of the LDC 20 may be output equal to the output voltage instruction, and the real output voltage Vout is greater than the auxiliary battery voltage Vbatt. Hence, the power of the main battery 10 may be supplied to the auxiliary battery 30 to be charged by the PWM control of the LDC 20. In addition, the power of the main battery 10 may be supplied to the electric field load 40 to be driven by the PWM control of the LDC 20 (S104).

PWM Off Mode

First, the LDC controller may be configured to determine whether the fuel efficiency mode selection unit 50 is manipulated (S100). When the fuel efficiency mode selection unit 50 is manipulated, the system may enter into the PWM off mode (S105). Accordingly, the LDC controller may be configured to adjust the output voltage instruction Vref for the LDC 20 to be input as a value less than that of the auxiliary battery voltage Vbatt (S106).

When the output voltage instruction Vref for the LDC 20 is less than the auxiliary battery voltage Vbatt, the PWM off mode for not performing the switching control of the switching element (transistor) in the LDC 20, i.e., the PWM control may be executed (S107). Thus, the real output voltage Vout of the LDC 20 may be output equal to the auxiliary battery voltage Vbatt, and the PWM control may be prevented from being performed. Hence, the LDC controller may be configured to adjust the power of the auxiliary battery 30 to be supplied to the electric field load 40 (S108).

Accordingly, the electric field load 40 may be driven by the power of the auxiliary battery 30, to allow the driving of the vehicle to be performed more smoothly. Accordingly, the PWM switching control of the LDC may not be performed by the fuel efficiency mode for artificially turning off the PWM control of the LDC 20, i.e., the PWM off mode, to terminate (e.g., cut off) the supply the power of the main battery 10 to the auxiliary battery 30 and the electric field load 40, thereby reducing the power consumption of the main battery 10 and improving fuel efficiency.

Meanwhile, when the voltage of the auxiliary battery 30 is reduced to a predetermined level or less in the PWM off mode, the power of the main battery 10 may be supplied to the auxiliary battery 30 and the electric field load 40 by turning on the PWM control again, to thus charge the auxiliary battery 30 and drive the electric field load 40.

In Sensing Auxiliary Battery Separation

When the auxiliary battery is separated to be replaced or when the auxiliary battery is separated due to external impact or the like, the power of the auxiliary battery may not be supplied to the electric field load, and therefore, the driving of the vehicle may be impossible.

Accordingly, when the auxiliary battery separation sensing unit 60 senses separation of the auxiliary battery in the PWM on mode or PWM off mode, the LDC controller may be configured to adjust the output voltage instruction Vref for the LDC 20 to be input as a value greater than the auxiliary battery voltage Vbatt. Thus, the PWM on state for performing the PWM control of the LDC 20 may be executed.

Accordingly, the PWM control of the LDC 20 may be in the on state even though the auxiliary battery is separated, and thus the power of the main battery 10 may be supplied to the electric field load 40. In addition, the driving of the electric field load 40 may be performed more smoothly thus allowing the driving of the vehicle to be performed more smoothly.

The present invention provides advantages as follows:

First, a fuel efficiency mode for artificially turning off PWM control of the LDC may be added, to prevent PWM switching control of the LDC from being performed without adding any separate hardware, thereby reducing power consumption of a main battery and improving fuel efficiency.

Second, when an auxiliary battery is separated during driving or stopping of a vehicle, power of the main battery may be temporarily supplied to an electric field load by performing the PWM control of the LDC, so that it may be possible to prevent the state in which the driving of the vehicle is impossible (e.g., driving may be continuously performed).

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A system for controlling a low voltage DC/DC converter (LDC) of a hybrid vehicle, the system comprising:

a fuel efficiency mode selector configured to artificially turn off pulse width modulation (PWM) control of the LDC;

an auxiliary battery separation sensor configured to sense whether an auxiliary battery is separated; and an LDC controller configured to turn off the PWM control of the LDC in response to a manipulation of the fuel efficiency mode selector, and turn on the PWM control of the LDC in response to the auxiliary battery separation sensor sensing a separation of the auxiliary battery.

2. The system of claim 1, wherein when the PWM control of the LDC is turned off in the manipulation of the fuel efficiency mode selector, power of the auxiliary battery is supplied to an electric field load.

3. The system of claim 1, wherein when the PWM control of the LDC is turned on in response to the auxiliary battery separation sensor sensing the separation of the auxiliary battery, power of a main battery is supplied to the electric field load.

4. A method for controlling an LDC of a hybrid vehicle, the method comprising:

selecting a fuel efficiency mode for artificially turning off PWM control of the LDC; and turning off the PWM control of the LDC and supplying power of an auxiliary battery to an electric field load in the selection of the fuel efficiency mode, wherein, in the selection of the fuel efficiency mode, an output voltage instruction of an LDC controller is input as a value less than that of an auxiliary battery voltage.

5. The method of claim 4, further comprising:

supplying power of a main battery to the auxiliary battery and the electric field load by turning on the PWM control again when the voltage of the auxiliary battery is reduced to a predetermined level or less.

6. The method of claim 4, further comprising:

sensing whether the auxiliary battery is separated; and inputting an output voltage instruction of the LDC controller as a voltage greater than that of an auxiliary battery voltage Vbatt when separation of the auxiliary battery is sensed, to turn on the PWM control of the LDC and supply the power of the main battery to the electric field load.

* * * * *